United States Patent
Urhonen

(10) Patent No.: US 10,490,180 B2
(45) Date of Patent: Nov. 26, 2019

(54) CONTROL OF ACOUSTIC MODES IN A ROOM

(71) Applicant: Genelec Oy, Iisalmi (FI)

(72) Inventor: Juha Urhonen, Iisalmi (FI)

(73) Assignee: Genelec Oy, Iisalmi (FI)

( * ) Notice: Subject to any disclaimer, the term of this patent is extended or adjusted under 35 U.S.C. 154(b) by 0 days.

(21) Appl. No.: 15/761,501

(22) PCT Filed: Aug. 31, 2016

(86) PCT No.: PCT/FI2016/050596
§ 371 (c)(1),
(2) Date: Mar. 20, 2018

(87) PCT Pub. No.: WO2017/037341
PCT Pub. Date: Mar. 9, 2017

(65) Prior Publication Data
US 2018/0268802 A1 Sep. 20, 2018

(30) Foreign Application Priority Data
Sep. 2, 2015 (FI) ...................................... 20155634

(51) Int. Cl.
*G10K 11/178* (2006.01)
*G10K 11/00* (2006.01)
(Continued)

(52) U.S. Cl.
CPC .............. *G10K 11/178* (2013.01); *G01H 7/00* (2013.01); *G10K 11/002* (2013.01);
(Continued)

(58) Field of Classification Search
CPC .... G10K 11/178; G10K 11/002; G10K 15/12; H04R 29/001; H04R 3/00; H04S 7/301
(Continued)

(56) References Cited

U.S. PATENT DOCUMENTS

| 4,549,289 A | 10/1985 | Schwartz et al. |
| 4,899,387 A | 2/1990 | Pass |

(Continued)

FOREIGN PATENT DOCUMENTS

| CN | 1659927 A | 8/2005 |
| CN | 103329566 A | 9/2013 |

(Continued)

OTHER PUBLICATIONS

Bao et al: "Design and test of a feedback controller for attenuating low frequency noise in a room", Acoustics Australia, vol. 37, No. 2, Aug. 2009, pp. 61-66.

(Continued)

*Primary Examiner* — David L Ton
(74) *Attorney, Agent, or Firm* — Seppo Laine Oy

(57) ABSTRACT

In accordance with an example aspect of the present invention, an apparatus is provided, the apparatus comprising at least one processing core, at least one memory including computer program code, the at least one memory and the computer program code being configured to, with the at least one processing core, cause the apparatus at least to derive, from first digital information describing a system impulse response caused by a loudspeaker to a first location in a first room, second digital information describing a cancelling impulse response, determine, for samples comprised in the second digital information, at least one of a delay value describing how much the samples are to be shifted in time and a gain factor describing how much the samples' magnitude is to be adjusted, so that an energy associated with a sum of the system impulse response and the cancelling impulse response is reduced, and employ the determined at least one of the delay value and the gain factor to generate a cancelling signal, and to add the cancelling signal to a signal provided to the loudspeaker.

17 Claims, 11 Drawing Sheets

(51) Int. Cl.

| | | |
|---|---|---|
| *G10K 15/12* | (2006.01) | |
| *H04R 29/00* | (2006.01) | |
| *H04R 3/00* | (2006.01) | |
| *G01H 7/00* | (2006.01) | |
| *H04S 7/00* | (2006.01) | |

(52) U.S. Cl.
CPC ........... *H04R 29/001* (2013.01); *G10K 15/12* (2013.01); *G10K 2210/12* (2013.01); *H04R 3/00* (2013.01); *H04S 7/301* (2013.01)

(58) Field of Classification Search
USPC ........................................ 381/56, 61, 63, 66
See application file for complete search history.

(56) References Cited

U.S. PATENT DOCUMENTS

| | | | |
|---|---|---|---|
| 5,272,656 A | 12/1993 | Genereux | |
| 8,300,838 B2* | 10/2012 | Wang | ...................... H04S 7/305 381/17 |
| 2006/0018486 A1* | 1/2006 | Neoran | ................ G10H 1/0091 381/63 |
| 2006/0050891 A1 | 3/2006 | Bhakitkar | |
| 2006/0072766 A1* | 4/2006 | Klein | .................... H04M 9/082 381/66 |
| 2006/0086237 A1* | 4/2006 | Burwen | .................... H04S 3/00 84/630 |
| 2007/0032895 A1 | 2/2007 | Nackvi et al. | |
| 2007/0121955 A1 | 5/2007 | Johnston et al. | |
| 2008/0069366 A1* | 3/2008 | Soulodre | ................. G01H 7/00 381/63 |
| 2008/0205667 A1 | 8/2008 | Bhakitkar et al. | |
| 2009/0225996 A1 | 9/2009 | Brooking | |
| 2015/0208169 A1 | 7/2015 | Tawada | |

FOREIGN PATENT DOCUMENTS

| | | |
|---|---|---|
| CN | 103634762 A | 3/2014 |
| CN | 104429100 A | 3/2015 |
| EP | 1322037 A2 | 6/2003 |
| EP | 1516511 B1 | 9/2009 |
| WO | WO9966492 A1 | 12/1999 |

OTHER PUBLICATIONS

Falourd et al: "Active low-frequency modal noise cancellation for room acoustics: An experimental study", International Congress on Sound and Vibration, Jul. 5-9, 2009, pp. 1-7.

Herzog et al: "Passive and active control of the low-frequency modes in a small room", Audio Engineering Society, Feb. 25-28, 1995, pp. 1-11.

Kashani et al: "Electronic Bass Trap", Audio Engineering Society, Oct. 28-31, 2004, pp. 1-7.

Mäkivirta et al: "Low-Frequency Modal Equalization of Loudspeaker-Room Responses", Audio Engineering Society, Sep. 21-24, 2001, pp. 1-9.

Zimmermann et al: "Control of Low Frequency Enclosed, Harmonic Sound Fields with Active Absorbers", CFA/DAGA '04, Strasbourg, Mar. 22-25, 2004, pp. 81-82.

Elliott et al: Multiple-Point Equalization in a Room Using Adaptive Digital Filters*. Journal of the Audio Engineering Society, Jan. 11, 1989. vol. 37, No. 11, pp. 899-907. XP000142129.

* cited by examiner

```
┌─────────────────────────────────────────────┐
│ Deriving, from first digital information    │
│ describing a system impulse response        │
│ caused by a loudspeaker to a first          │ ─── 1010
│ location in a first room, second digital    │
│ information describing a cancelling         │
│ impulse response                            │
└─────────────────────────────────────────────┘
                      │
┌─────────────────────────────────────────────┐
│ Determining, for samples comprised in the   │
│ second digital information, at least one    │
│ of a delay value describing how much the    │
│ samples are to be shifted in time and a     │
│ gain factor describing how much the         │ ─── 1020
│ samples' magnitude is to be adjusted, so    │
│ that an energy associated with a sum of     │
│ the system impulse response and the         │
│ cancelling impulse response is minimized    │
└─────────────────────────────────────────────┘
                      │
┌─────────────────────────────────────────────┐
│ Employing the determined at least one of    │
│ the delay value and the gain factor to      │
│ generate a cancelling signal, and adding    │ ─── 1030
│ the cancelling signal to a signal           │
│ provided to the loudspeaker                 │
└─────────────────────────────────────────────┘
```

FIGURE 10

CONTROL OF ACOUSTIC MODES IN A ROOM

FIELD OF INVENTION

The present invention relates to the field of loudspeakers and controlling, at least in part, at least one mode in a room.

BACKGROUND OF INVENTION

Equalization of an audio signal provided to a loudspeaker may be used to control a frequency response. For example, when a loudspeaker tends to output sound at a first frequency range at a lower amplitude relative to other frequencies, the first frequency range may be amplified in the input signal, to compensate for the performance of the loudspeaker and to yield a flatter frequency response.

In addition to, or alternatively to, flattening a frequency response, equalization may be used to modify the frequency response to conform to aesthetic preferences and/or characteristics of an environment where the loudspeaker is located. For example, some types of music may be played with lower frequencies enhanced in case the music comprises more information at said lower frequencies.

When listening to sound, such as music, output from at least one loudspeaker in a room, characteristics of the room may affect the listening experience. Such characteristics include physical dimensions of the room, materials used in the walls, roof and floor, and items such as furniture disposed in the room. Also placement of loudspeakers and the listener relative to the room and each other may affect the listening experience. The listening experience may be perceptibly different at different locations in the room.

When a room is capable of reflecting sound, using a loudspeaker in the room may give rise to resonances, also called room modes, or modes, in the space enclosed by the walls and/or the roof and floor. A mode occurs at a frequency corresponding to a multiple of half a wavelength, whereby the dimensions of the room define the frequencies that may resonate in that room. The smaller the room, the higher the lowest mode frequency. As a consequence, larger rooms may have lowest resonances that are too low for humans to hear. Also, as modes occur at frequencies related to the room dimensions, there are also modes at higher frequencies. The density of room modes, defined as the number of room modes per unit of frequency, tends to increase as the frequency increases.

A room mode may store energy. Energy of the sound output by the loudspeaker is stored in the vibration sustained by the mode. In case the loudspeaker is switched off, the room mode will attenuate at a rate determined by, among other things, absorbance of the room. As room modes may affect the listening experience, controlling the energy stored in modes is of use. Control methods include design of the room geometry, covering the walls with materials having absorbance at the frequencies where mode resonances exist, and equalizing loudspeaker output to be low at the mode frequencies, so that the sound level at the room modes will not grow larger than the sound level in the frequencies close to the mode, hence producing equalization of the magnitude change effected by the mode.

Document WO99/66492 discloses a sound reproduction apparatus for reducing the level of acoustical reflections in a room. Document EP1322037 discloses a method for designing a modal equalizer for a low frequency sound reproduction. Document EP1516511 discloses a method for designing a modal equalizer for a low frequency audible range especially for closely positioned modes.

SUMMARY OF THE INVENTION

In accordance with a first aspect of the present invention, an apparatus is provided, the apparatus comprising at least one processing core, at least one memory including computer program code, the at least one memory and the computer program code being configured to, with the at least one processing core, cause the apparatus at least to derive, from first digital information describing a system impulse response caused by a loudspeaker to a first location in a first room, second digital information describing a cancelling impulse response, determine, for samples comprised in the second digital information, at least one of a delay value describing how much the samples are to be shifted in time and a gain factor describing how much the samples' magnitude is to be adjusted, so that an energy associated with a sum of the system impulse response and the cancelling impulse response is reduced, and employ the determined at least one of the delay value and the gain factor to generate a cancelling signal, and to add the cancelling signal to a signal provided to the loudspeaker.

Various embodiments of the first aspect may comprise at least one feature from the following bulleted list:
- the signal provided to the loudspeaker comprises a payload signal
- the at least one memory and the computer program code are configured to, with the at least one processing core, further cause the apparatus to receive the first digital information from a sensor
- the at least one memory and the computer program code are configured to, with the at least one processing core, further cause the apparatus to derive the second digital information at least in part by multiplying each sample comprised in the first digital information by a coefficient value
- the coefficient value comprises a negative value
- the at least one memory and the computer program code are configured to, with the at least one processing core, further cause the apparatus to low-pass filter the first digital information before deriving the second digital information
- the at least one memory and the computer program code are configured to, with the at least one processing core, further cause the apparatus to determine, based on a second system impulse response and a second cancelling impulse response, at least one of a second delay value and a second gain factor, the second system impulse response being caused by the loudspeaker to a second location in the first room, and to, based on operator choice, add either the cancelling signal or a second cancelling signal based on at least one of the second delay value and the second gain factor to the signal provided to the loudspeaker
- the at least one memory and the computer program code are configured to, with the at least one processing core, cause the apparatus to determine the at least one of the delay value and the gain factor by employing an optimization algorithm
- the optimization algorithm comprises at least one of a least-squares minimization, simulated annealing and direct search algorithm
- the system impulse and the cancelling impulse response together form an equalized system impulse response the system impulse and the cancelling impulse response together form a reproduction system where, for at least one resonance, the resonance in the room is removed by cancelling the acoustic reflection caused by at least one wall.

In accordance with a second aspect of the present invention, an apparatus is provided, the apparatus comprising a receiver configured to receive an input signal, a delay buffer configured to delay, for a configurable delay length, a first copy of the input signal to produce a cancelling signal, and addition circuitry configured to add samples comprised in the cancelling signal to samples comprised in a second copy of the input signal.

Various embodiments of the second aspect may comprise at least one feature from the following bulleted list:
- in producing the cancelling signal the apparatus is further configured to cause samples from the delay buffer to be multiplied by a coefficient value, where the coefficient value causes the phase of the signal to be effectively inverted
- the coefficient value comprises a negative value
- the apparatus is configured to invert and amplitude scale samples from the delay buffer
- the apparatus further comprises a low-pass filter arranged to accept and low-pass filter the first copy of the input signal, and provide the low-pass filtered first copy of the input signal to the delay buffer
- the apparatus further comprises a high-pass filter arranged to accept and high-pass filter the second copy of the input signal, and provide the high-pass filtered second copy of the input signal to the addition circuitry.

In accordance with a third aspect of the present invention, a method is provided, the method comprising deriving, from first digital information describing a system impulse response caused by a loudspeaker to a first location in a first room, second digital information describing a cancelling impulse response, determining, for samples comprised in the second digital information, at least one of a delay value describing how much the samples are to be shifted in time and a gain factor describing how much the samples' magnitude is to be adjusted, so that an energy associated with a sum of the system impulse response and the cancelling impulse response is reduced, and employing the determined at least one of the delay value and the gain factor to generate a cancelling signal, and adding the cancelling signal to a signal provided to the loudspeaker.

Various embodiments of the third aspect may comprise at least one feature corresponding to a feature from the bulleted list laid out above in connection with the first aspect.

In accordance with a fourth aspect of the present invention a method is provided, the method comprising receiving an input signal, delaying, in a delay buffer, for a configurable delay length, a first copy of the input signal to produce a cancelling signal, and adding samples comprised in the cancelling signal to samples comprised in a second copy of the input signal.

Various embodiments of the fourth aspect may comprise at least one feature corresponding to a feature from the bulleted list laid out above in connection with the second aspect.

In accordance with a fifth aspect of the present invention, an apparatus is provided, the apparatus comprising means for deriving, from first digital information describing a system impulse response caused by a loudspeaker to a first location in a first room, second digital information describing a cancelling impulse response, means for determining, for samples comprised in the second digital information, at least one of a delay value describing how much the samples are to be shifted in time and a gain factor describing how much the samples' magnitude is to be adjusted, so that an energy associated with a sum of the system impulse response and cancelling impulse response is reduced, and means for employing the determined at least one of the delay value and the gain factor to generate a cancelling signal, and for adding the cancelling signal to a signal provided to the loudspeaker.

In accordance with a sixth aspect of the present invention, an apparatus is provided, the apparatus comprising means for receiving an input signal, means for delaying, for a configurable delay length, a first copy of the input signal to produce a cancelling signal, and means for adding samples comprised in the cancelling signal to samples comprised in a second copy of the input signal.

In accordance with a seventh aspect of the present invention, there is provided a non-transitory computer readable medium having stored thereon a set of computer readable instructions that, when executed by at least one processor, cause an apparatus to at least derive, from first digital information describing a system impulse response caused by a loudspeaker to a first location in a first room, second digital information describing a cancelling impulse response, determine, for samples comprised in the second digital information, at least one of a delay value describing how much the samples are to be shifted in time and a gain factor describing how much the samples' magnitude is to be adjusted, so that an energy associated with a sum of the system impulse response and cancelling impulse response is reduced, and employ the determined at least one of the delay value and the gain factor to generate a cancelling signal, and adding the cancelling signal to a signal provided to the loudspeaker.

In accordance with an eighth aspect of the present invention, there is provided a non-transitory computer readable medium having stored thereon a set of computer readable instructions that, when executed by at least one processor, cause an apparatus to at least receive an input signal, delay, for a configurable delay length, a first copy of the input signal to produce a cancelling signal, and add samples comprised in the cancelling signal to samples comprised in a second copy of the input signal.

In accordance with a ninth aspect of the present invention, there is provided a computer program configured to cause a method in accordance with at least one of the third or fourth aspect to be performed.

INDUSTRIAL APPLICABILITY

At least some embodiments of the present invention provide for improved audio resonance cancellation and/or a larger area in a closed space where such resonance cancellation succeeds.

BRIEF DESCRIPTION OF THE DRAWINGS

FIG. 10 is a first flow graph of a method in accordance with at least some embodiments of the present invention.

DETAILED DESCRIPTION OF EXAMPLE EMBODIMENTS

By introducing into an input signal a delayed and attenuated copy of the signal, before feeding the input signal to a loudspeaker element, room modes may be controlled by causing the loudspeaker to output sound in the same frequency but in opposite phase into the modes after a certain time. This may serve to actively drain energy from the room modes, at least partly cancelling sound. Using the same loudspeaker for production of sound and the opposite-phase cancelling sound, the area of effect of the mode cancellation may be enhanced compared to solutions where a separate loudspeaker is employed to output the cancelling sound controlling the room mode. As the cancelling sound radiated according to the invention is radiated at exactly the same physical location and by the same acoustic structure as the original audio, the acoustic effects, such as delay, reflections, and reverberation, experienced by the cancelling sound behave in the same way as those for the original sound. This may enhance the efficiency of the mode control according to the present invention.

Figure 1:
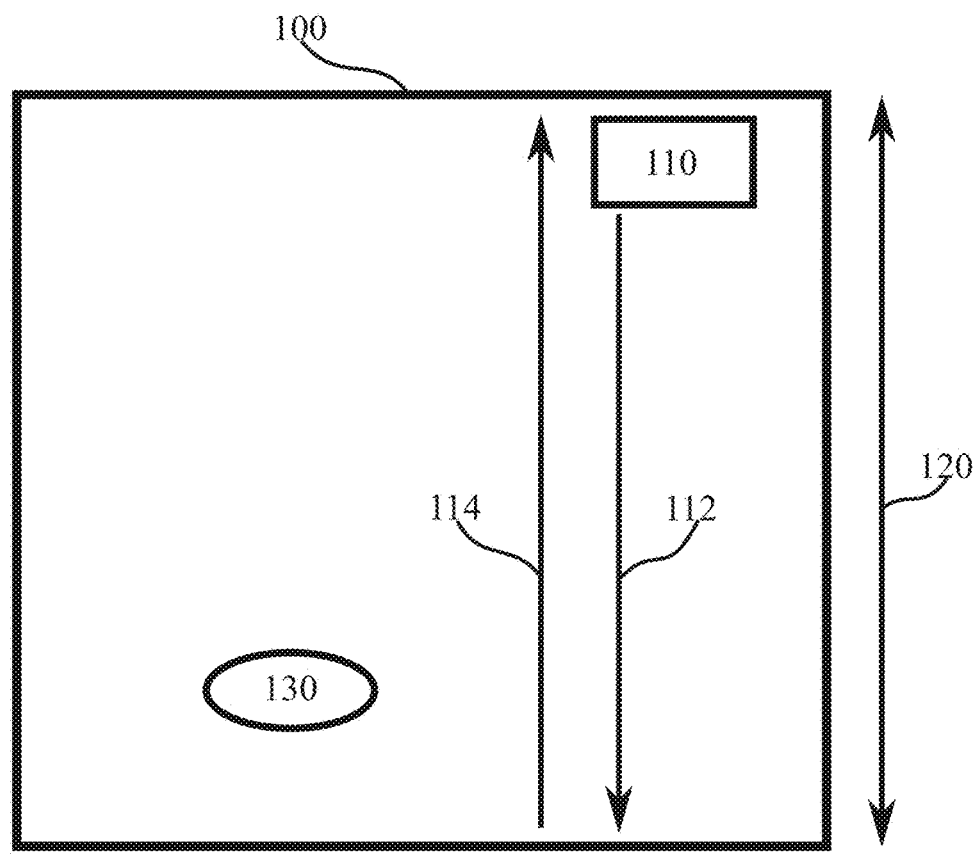
FIG. 1 illustrates an example system capable of supporting at least some embodiments of the present invention.

FIG. 1 illustrates an example system capable of supporting at least some embodiments of the present invention. FIG. 1 illustrates room 100, which may be constructed of brick, concrete, plasterboard, or other material suitable for building rooms. Such materials typically exhibit sound reflection. Disposed in room 100 is loudspeaker 110, which may comprise, for example, a subwoofer, woofer, mid-range or full-range driver or combination thereof. Loudspeaker 100 may be based on electrodynamic, magnetic, magnetostrictive, electrostatic, or other technology, for example. Loudspeaker 110 may be configured to produce sound according to an input signal, which encodes the sound in a suitable format.

Loudspeaker 110 may emit sound omnidirectionally or at least only partially directionally. In some loudspeakers, the directionality of emitted sound may at least partly depend on frequency. For example, lower frequencies may be emitted more omnidirectionally than higher frequencies. Arrow 112 denotes sound emitted from loudspeaker 110, and arrow 114 denotes a reflection of at least part of the sound denoted by arrow 112. Acoustic reflection may give rise to room modes, such that dimension 120 defines a collection of room mode frequencies. To the extent loudspeaker 110 emits sound at these frequencies, the energy associated with this sound may have a tendency to accumulate in the room modes.

Location 130 denotes the location in room 100 were a listener may listen to the sound output from the loudspeaker 110. The placement of location 130 in room 100 in FIG. 1 is schematic only and does not limit the possible locations in the room 100 where the location 130 may be.

Figure 2:
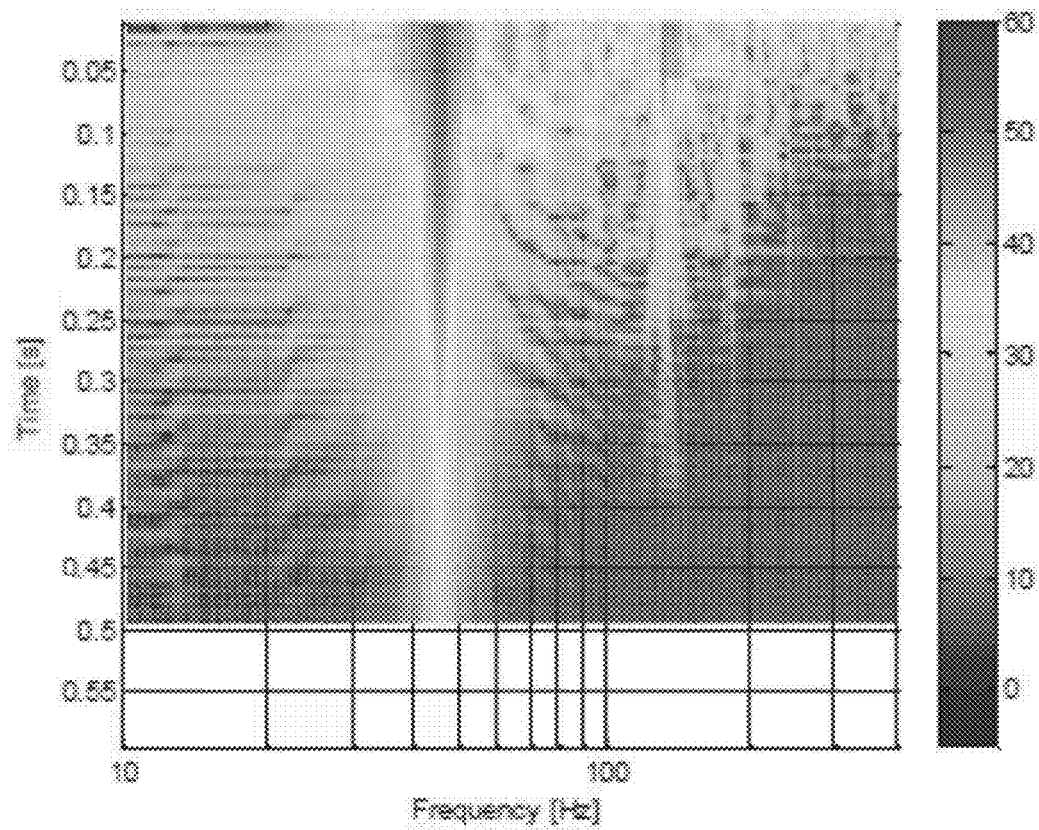
FIG. 2 illustrates decay of sound level of a room mode frequency.

FIG. 2 illustrates a decay of sound level of a room mode frequency. In the illustrated coordinate system, time advances linearly from the top toward the bottom. Frequency advances logarithmically from left to right. Sound level is grey scale coded in the presentation.

In the illustrated graph, a room mode at frequency 45 Hz is visible. A 60-dB decay of the sound level stored in the mode takes about 500 milliseconds. Such a mode may have a negative effect on the listening experience, in case the listener is in a location in the room where the mode is audible.

To control the 45 Hz mode, a loudspeaker such as loudspeaker 110 of FIG. 1 may be configured, for example by equalization, to emit less energy at the 45 Hz frequency. This will reduce the sound level close to the mode compared to the case where no magnitude equalization is used. However, this conventional magnitude equalization does not reduce the decay rate of the sound level of the mode. The decay rate is the rate at which the sound pressure reduces after the sound input by the loudspeaker has stopped. Further, it is difficult to obtain a mathematically perfect cancellation that completely suppresses the effect of the room mode resonance, wherefore this method is imperfect.

Active cancellation of sound comprises emitting, for example from a loudspeaker element, sound that sums with sound in opposite phase, resulting in reduction of sound level. As the original sound as well as the cancelling sound travel in space three-dimensionally, to all directions, the sound emitted from the loudspeaker element to cancel the original sound may result in only local cancellation in the room, and then the cancellation does not occur equally throughout the room volume. This is since the phases of the original and cancelling sounds are not exactly in the opposite phase throughout the room. Such cancellation may be arranged, for example, to happen locally in the room, by providing a microphone close to the loudspeaker driver which radiates the cancelling sound, which may be considered a secondary driver. A negative feedback loop may be effectively provided from the signal picked by the microphone to the signal radiated by the driver, effecting reduction of sound level. Such an arrangement may be constrained using a passband filter to a certain passband of frequencies. Such an arrangement creates a silent zone close to the secondary driver, effectively reducing acoustic resonance and modifying the apparent absorbance of the room wall in the vicinity of the secondary driver. Such arrangements can provide reduction of certain room modes, and are typically only effective close to the secondary driver, and are in this way limited compared to the proposed technology.

In order to improve the listening experience at location 130 cancellation of the room mode, or a plurality of room modes, may be attempted so that the effect of the cancellation occurs at least at location 130. If room modes are not cancelled to the same extent elsewhere in room 100, that may be of little consequence to the listener, if he is listening at location 130. In order to be useful in improving the listening experience, cancellation of the room modes need not be perfect as partial cancellation may already provide a clear improvement in the listening experience.

To perform the cancellation, a separate loudspeaker element can be used to emit the cancelling sound, configured so that the effect of the sound emitted from this separate loudspeaker element would at least in part cancel the effect of room modes at location 130. Alternatively, one and the same loudspeaker element may be used in both generating the original sound for listening, and the cancelling sound.

To enable such cancellation, loudspeaker 110, or a control element of loudspeaker 110, may be provided with a system impulse response of loudspeaker 110 at location 130, that is, an impulse response that loudspeaker 110 causes to location 130 by emitting sound from the location where loudspeaker 110 is in room 100. For example, a microphone may be placed in location 130 to record the sound loudspeaker 110 emits, and the information recorded, for example in digitized format, may be provided to the loudspeaker 110 or to the control element to facilitate determination of the system impulse response.

The system impulse response may be low-pass filtered prior to providing it to the loudspeaker or the control element, when the room modes to be controlled are expected to occur at low frequencies. In the loudspeaker or control element, the system impulse response may be inverted.

Once the system impulse response is inverted, delay and/or amplitude scaling may be varied to determine a delay and/or gain factor that minimizes the energy of the sum of the original system impulse response and the delayed and/or gain adjusted impulse response at location 130. This scaled and/or delayed impulse response is called the cancelling impulse response. The sum energy may be determined as a square sum of the original system impulse response and the cancelling impulse response, and this quadratic expression may be minimized using a minimization algorithm. Energy is related to sound pressure level and audio signal level. Examples of suitable minimization algorithms include the simplex algorithm, Newton's method and the Nelder-Mead method. More generally, an optimization algorithm may be used, such as for example a simulated annealing algorithm or a direct search algorithm.

In some embodiments, using an optimization algorithm, such as for example a minimization algorithm, may be unnecessary if the loudspeaker or control element can determine, for example from a delay value and amplitude of a first peak in the system impulse response vector, the correct delay value and gain factor for cancellation at location 130. For example, the delay value may be taken as the delay value associated with the first early reflection peak in the system impulse response, and the gain factor may be set to −3 dB, for example.

In yet further embodiments, loudspeaker 110 or the control element may be configured to determine the delay values and/or gain factors experimentally. In these embodiments, the loudspeaker or control element may invert the recording, and then emit test sounds. The test sounds may comprise the original sound and the delayed and/or inverted copies of the original sound. In this way the loudspeaker or control element may determine experimentally, which delay values and gain factors yield the lowest-energy sum impulse response in location 130.

Figure 4:
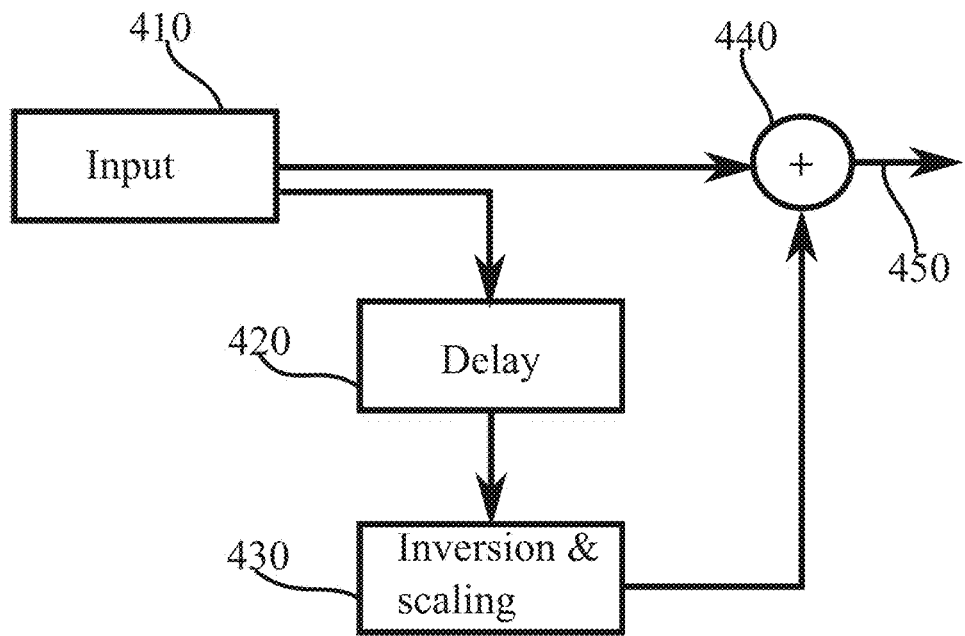
FIG. 4 illustrates use of a delay value and a gain factor in accordance with at least some embodiments of the present invention.

Regardless of the way the delay value and/or gain factor are determined, the determined delay value and/or gain factor may then be employed in the loudspeaker when playing back sound. FIG. 4 illustrates an example of use of the delay value and/or gain factor. In effect, using the cancelling impulse response with the system impulse response as described herein may be seen as producing an equalized system impulse response. The determination of the delay value and/or the gain factor may occur in a loudspeaker, a loudspeaker controller or a control device, such as for example a processor, configured to control a loudspeaker or loudspeaker controller when implanted therein.

In some embodiments, more than one location in room 100 may be used to determine delay value and/or gain factors. For example, if the room has a second listening position, a delay value and/or gain factor may be determined also for the second location. Subsequently, the user may select which delay value and/or gain factor is used, to optimise performance at a desired listening location. Since the cancellation of room modes may be location-specific, it may be that when the second location is used, room modes in location 130 are not effectively cancelled. Likewise, when location 130 is used, it may be that the room modes are not effectively cancelled in the second location.

Determining the delay values and/or gain factors as described above may achieve cancellation or at least reduction of room modes in a room with a complicated shape or comprising objects that make it difficult to calculate sound propagation and room characteristics analytically. Using the same loudspeaker element to play the original sound and the cancelling sound for listening at location 130 is useful since the sounds interact with the room in the same way as they are emitted from the same device, into the same direction. An additional advantage of at least some embodiments of the present invention is that no separate cancellation loudspeaker is needed. The present invention is superior to using a separate cancellation loudspeaker as the original and cancelling sounds are reproduced similarly and interact with the room in the same way. As a result the volume of room 100 where sufficient mode cancellation occurs may be larger when the present invention is used.

In general some embodiments of the invention obtain the cancelling impulse response without scaling and/or inverting, applying only a delay. Thus any multiplication phase described above, and, is not a mandatory feature of the invention. For example, in narrow band implementations selecting the delay value correctly may result in a cancelling impulse response. In such cases, the delay value may be determined using optimization or other methods. Optimization may be easier and faster when only one parameter is being optimized. On the other hand, in some embodiments more than one delay value and/or gain factor may be chosen to obtain the cancelling impulse response.

Figure 3:
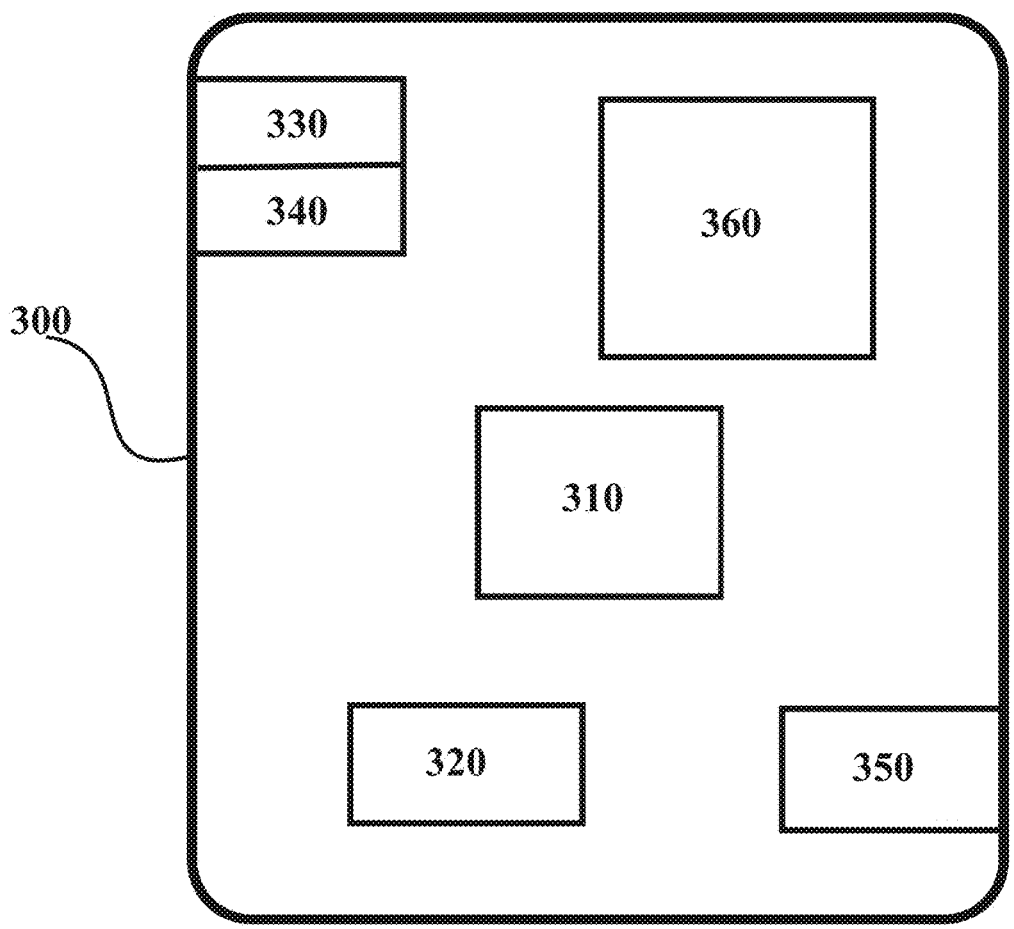
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a loudspeaker apparatus, or a control apparatus for a loudspeaker. Comprised in device 300 is processor 310, which may comprise, for example, a single- or multi-core processor wherein a single-core processor comprises one processing core and a multi-core processor comprises more than one processing core. Processor 310 may comprise a Qualcomm Snapdragon 800 processor, for example. Processor 310 may comprise more than one processor. A processing core may comprise, for example, a Cortex-A8 processing core manufactured by Intel Corporation or a Brisbane processing core produced by Advanced Micro Devices Corporation. Processor 310 may comprise at least one application-specific integrated circuit, ASIC. Processor 310 may comprise at least one field-programmable gate array, FPGA. Processor 310 may be means for performing method steps in device 300. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise magnetic, optical and/or holographic memory, for example. Memory 320 may be at least in part accessible to processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions.

Device 300 may comprise a transmitter 330. Device 300 may comprise a receiver 340. Transmitter 330 and receiver 340 may be configured to transmit and receive, respectively, information in accordance with at least one standard. Transmitter 330 may comprise more than one transmitter. Receiver 340 may comprise more than one receiver. Transmitter 330 and/or receiver 340 may be configured to operate in accordance with Ethernet and/or a communication bus internal to a loudspeaker. Transmitter 330 and/or receiver 340 may be configured to communicate using a digital or an analogue technology, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to select inputs, sound output formats and/or select a listening position in a room which is to be used.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Processor 310, memory 320, transmitter 330, receiver 340, NFC transceiver 350 and/or UI 360 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

FIG. 4 illustrates use of delay values and gain factors, for example in a subwoofer element. In phase 410, an input signal is received, wherein the input signal may comprise, for example a digital input signal. The received input signal is copied into two copies, a first copy being fed to phase 420, where the first copy is delayed by the determined delay value. From phase 420 the delayed first copy is provided to phase 430, where the amplitude of the first copy is modified by a coefficient value, for example one that is within the interval [−1, 0], causing the delayed first copy to be inverted and scaled in amplitude.

From phase 430 the delayed, inverted and scaled copy is summed to a second copy of the input signal at phase 440, producing a modified signal. In phase 450 this is provided to a loudspeaker. In some embodiments, the input signals are analog rather than digital in nature. In case the loudspeaker element is a subwoofer element, low-pass filtering may not be necessary since subwoofers are expected to operate on a narrow frequency band and any phase shift caused by low-pass filtering may be avoided in generating the delayed first copy of the input signal.

Figure 5:
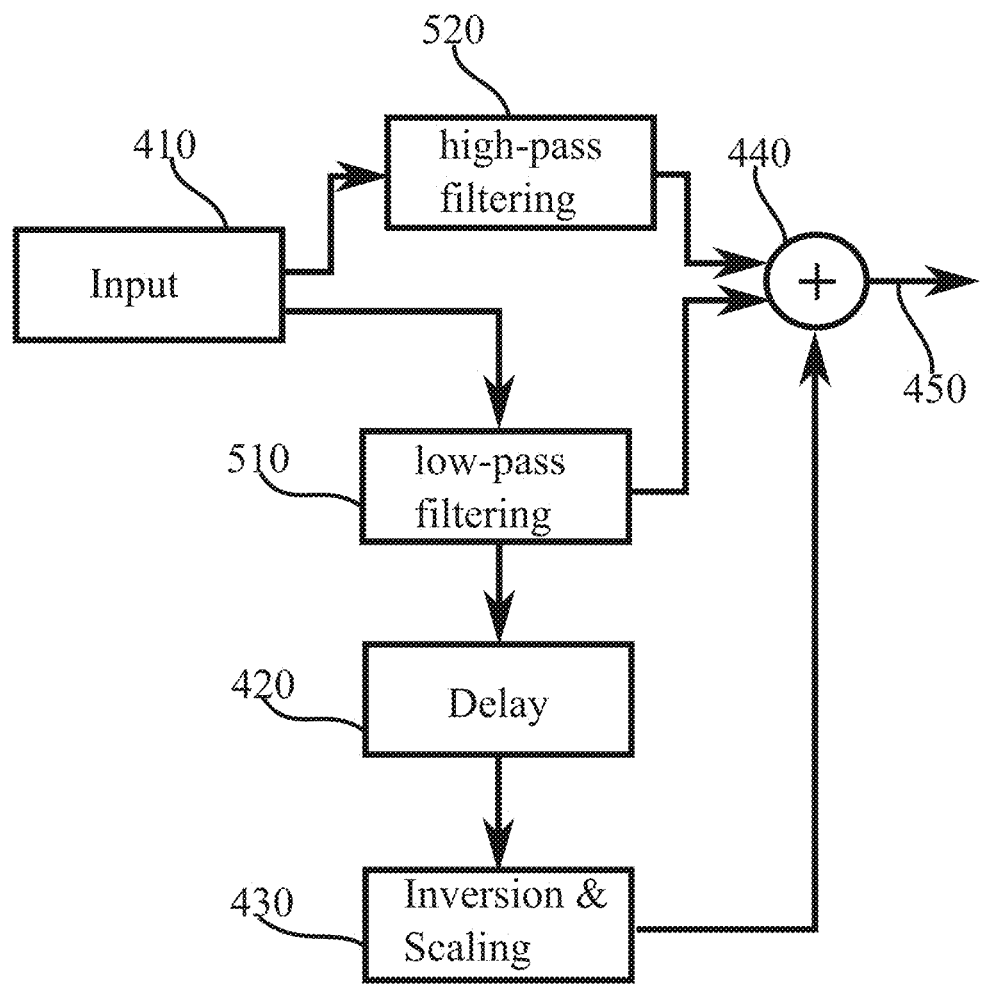
FIG. 5 illustrates a second use of a delay value and a gain factor in accordance with at least some embodiments of the present invention.

FIG. 5 illustrates a second use of delay values and gain factors, for example in a main loudspeaker. FIG. 5 may take place in a digital domain, for example. Phases 410, 420, 430, 440 and 450 here essentially conform to like-numbered phases of FIG. 4. FIG. 5 additionally comprises phase 510, where the first copy of the input signal is low-pass filtered before delaying. One copy of low-pass filtered input signal may be provided from phase 510 to phase 440, where the first copy, second copy and copy from phase 510 are summed together. The summing may take place by summing digital samples, for example. Alternatively, the low-pass filtering may occur after the delaying, for example between phases 420 and 430, or between phases 430 and 440. FIG. 5 further comprises high-pass filtering the second copy of the input signal prior to the mixing phase 440. In effect, the first copy corresponds to low frequencies and the second copy corresponds to high frequencies of the input signal, wherein the delaying and amplitude scaling of phases 420 and 430 are applied only to the low frequencies. This is since the room modes are expected to primarily occur in low frequencies. This causes the cancelling impulse response to contain a limited range of frequencies, typically low frequencies, where room modes need to be controlled.

Figure 6:
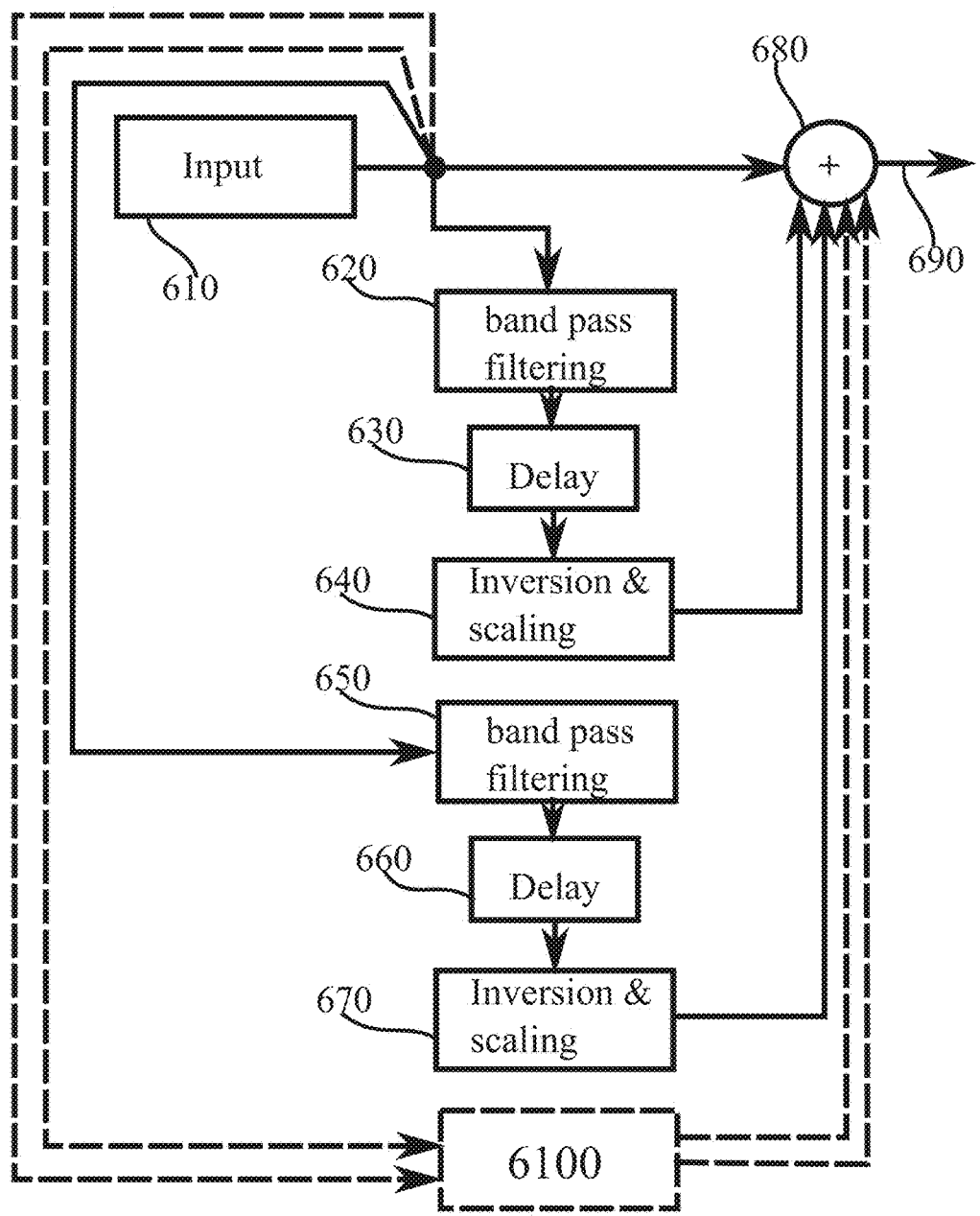
FIG. 6 illustrates use of at least two delay values and gain factors in accordance with at least some embodiments of the present invention.

FIG. 6 illustrates a use of at least two delay values and gain factors. In FIG. 6, an input is provided to a first band pass filtering stage 620 and to a second band pass filtering stage 650. One copy of the input may be provided directly to summing stage 680. In first band-pass filtering stage 620 the input is band-pass filtered, and the result of this band-pass filtering is provided to delay stage 630. In delay stage 630, a first delay value is applied to the result obtained from the first band-pass filtering stage. The delayed samples are provided from delay stage 630 to first inversion and scaling stage 640, where the signal is caused to be scaled with a first gain factor and/or inverted to obtain a first cancelling signal. From first inversion and scaling stage 640 the first cancelling signal is provided to summing stage 680.

A copy of the input is likewise provided to a second band pass filtering stage 650. In second band-pass filtering stage 650 the input is band-pass filtered, and the result of this band-pass filtering is provided to delay stage 660. The passband of second band pass filtering stage 650 may be different from a passband of first band-pass filtering stage 620. In delay stage 660, a second delay value is applied to the result obtained from the second band-pass filtering stage 650. The delayed samples are provided from delay stage 660 to second inversion and scaling stage 670, where the signal is caused to be scaled with a second gain factor and/or inverted to obtain a second cancelling signal. From second inversion and scaling stage 670 the second cancelling signal is provided to summing stage 680.

Although illustrated as comprising two band-pass, delay and inversion and scaling stages, the architecture of FIG. 6 comprises variants with a different number, for example there may be three, four or five band-pass, delay and inversion and scaling stages. In general, each band-pass, delay and inversion and scaling stage arrangement may be configured to provide one cancelling signal to summing stage 680. Band-pass, delay and inversion and scaling arrangements beyond the second one are illustrated in FIG. 6 schematically as arrangements 6100. The arrangements 6100 receive copies of the input signal, derive cancelling signals as described above and provide the cancelling signals to summing stage 680.

In summing stage 680 the copy of the signal received directly from input 610, and each of the cancelling signals received from the inversion and scaling stages are summed to produce an output signal 690.

In the architecture of FIG. 6, an advantage may be obtained wherein cancelling signals are arranged to operate on frequencies relevant to room modes, wherein other frequencies are unaffected. In at least some embodiments, the passbands of band pass filtering stages are configurable. The room modes, and passbands of the band pass filtering stages, may be on relatively low frequencies. In some embodiments, the number of band-pass, delay and inversion and scaling stage arrangements used may be configurable. For example, the number of these arrangements may be selected to match the number of detected room modes. For example, a device may comprise a plurality of such arrangements, which are taken into use selectively, or a device may perform processing in software, enabling dynamic generation of such arrangements.

Figure 7:
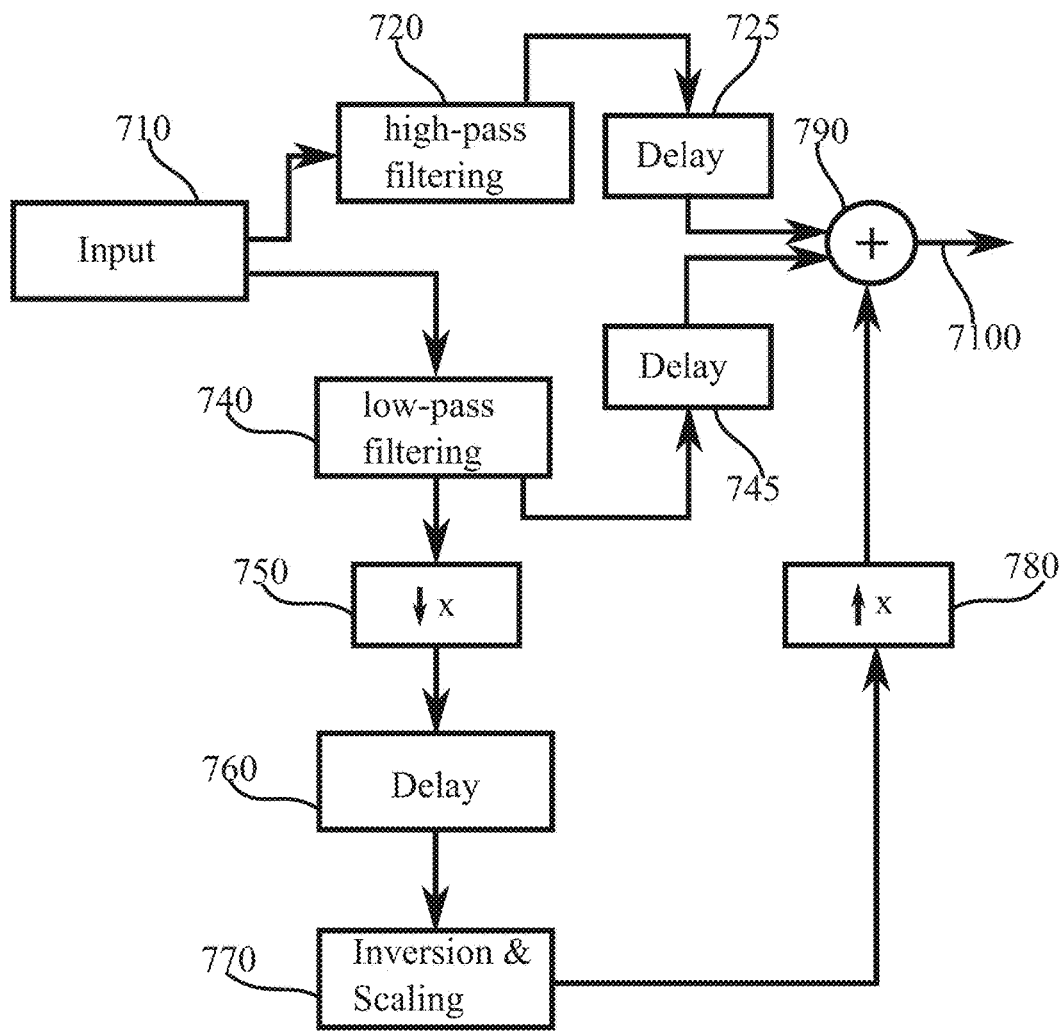
FIG. 7 illustrates an example architecture in accordance with at least some embodiments of the present invention.

FIG. 7 illustrates an example architecture in accordance with at least some embodiments of the present invention. In FIG. 7, an input signal is provided in one copy to a high-pass filtering stage 720 and in one copy to a low-pass filtering stage 740. In high-pass filtering stage 720 the signal is high-pass filtered, and a result of the high-pass filtering is provided via a delay stage 725 to summing stage 790.

In low-pass filtering stage 740 the signal is low-pass filtered, and one copy of a result of the low-pass filtering is provided via a delay stage 745 to summing stage 790. Another copy of the low-pass filtered signal is provided to decimation stage 750. In decimation stage 750 the number of samples per time unit is reduced, for example by a factor of two or four. Subsequent to the decimation, the signal is delayed in accordance with a delay value in delay stage 760, and provided to an inversion and scaling stage 770. In inversion and scaling stage 770 the signal is caused to be scaled with a gain factor and/or inverted to obtain a cancelling signal. In general, being caused to be scaled may comprise being multiplied by a coefficient value. A cancelling signal is output from inversion and scaling stage 770 to summing stage 790 via an interpolating stage 780, where the sample frequency of the signal is restored, that is, the decimation of stage 750 is reversed. Interpolation may be performed using an interpolation filter, for example. Interpolation stage 780 may comprise a low-pass filtering function that is arranged to remove imaging created by the interpolating. In summing stage 790, an output signal 7100 is obtained by summing the high-pass filtered signal, the low-pass filtered signal and the cancelling signal. The delays in delay stages 760, 725 and 745 need not be the same. In detail, in at least some embodiments no two delays in these three delay stages are the same. The delays of delay stages 725 and 745 may be implemented to compensate for delays incurred in low-pass filtering stage 740, delay stage 760, inversion and scaling stage 770 and the decimation 750 and interpolating 780 stages, so that signals arrive in summing stage 790 in a synchronized way to facilitate their summing.

An advantage of deriving the cancelling signal in a decimated form is that computational complexity may be reduced. A sufficiently accurate cancelling signal may be obtained in a decimated form, since it is foreseen than in many cases the room modes will have relatively low frequency.

Figure 8:
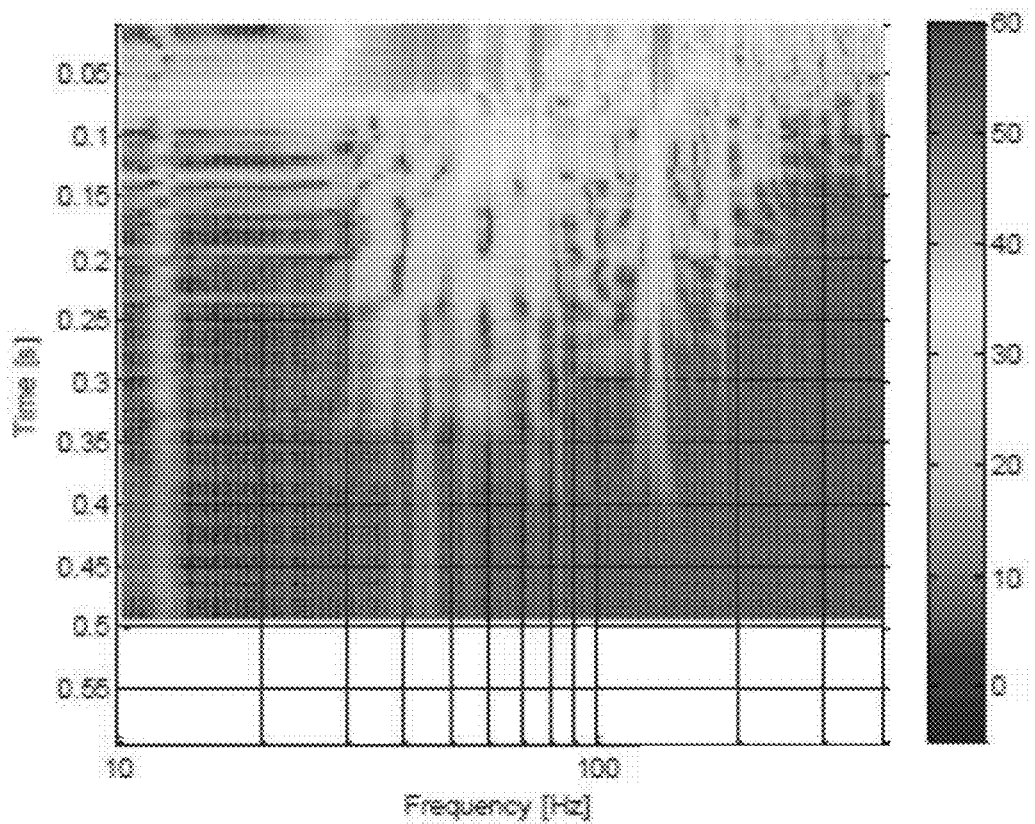
FIG. 8 illustrates a decay of the sound levels at a room mode when mode cancellation is used.

FIG. 8 illustrates a decay of a room mode with mode cancellation, for example cancellation in accordance with FIG. 4, FIG. 5, FIG. 6 or FIG. 7. FIG. 8 illustrates the same room as FIG. 2, however one immediately sees that with cancellation, the 45 Hz mode is substantially reduced in level in less than 100 milliseconds. This has the effect of perceptibly improving the listening experience, for example at location 130, rendering the decay largely inaudible.

Figure 9:
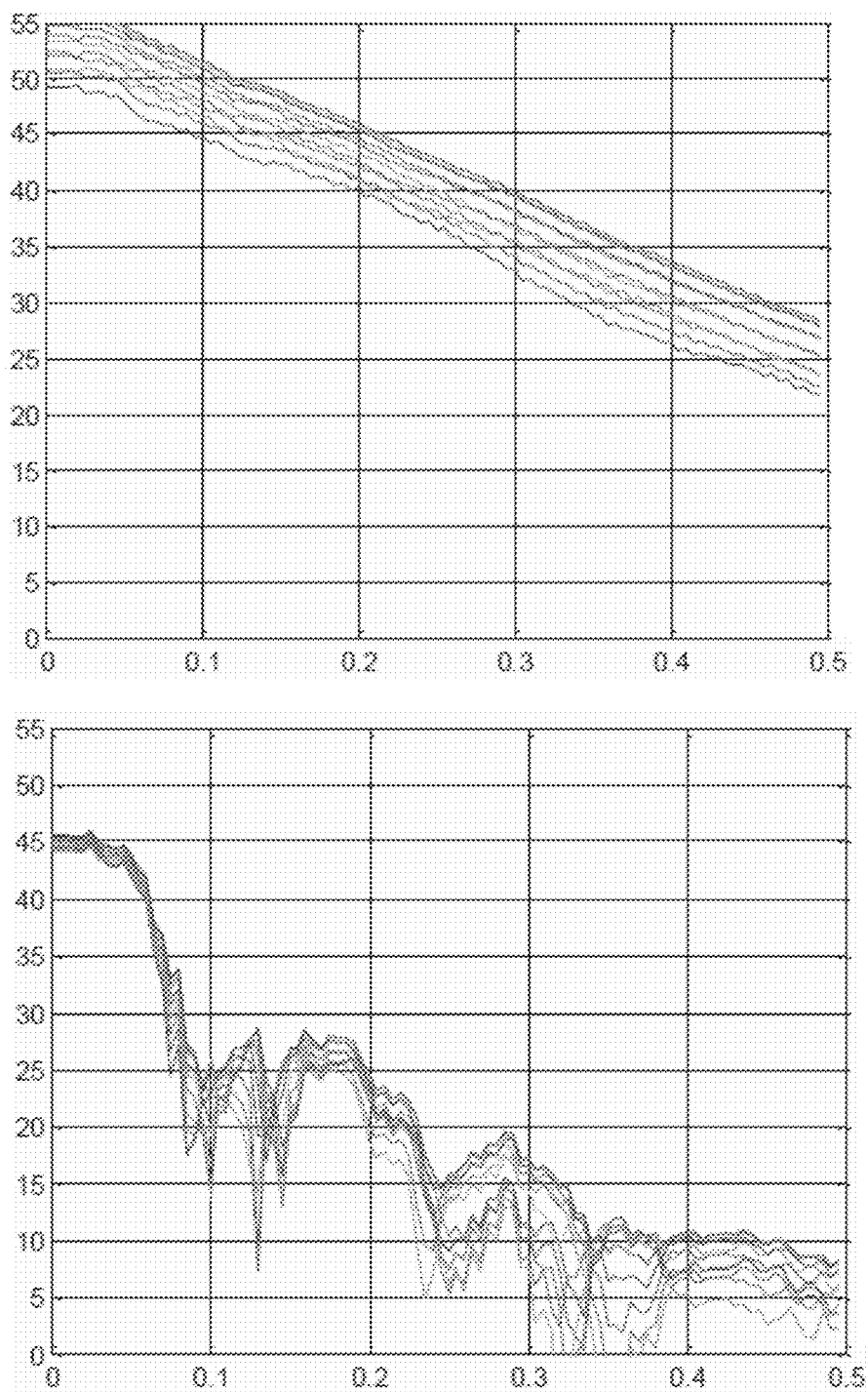
FIG. 9 illustrates decay of the sound level at a room mode with and without the room mode cancellation.

FIG. 9 illustrates decay of a room mode with and without cancellation. In graphs 910 and 920, each of the plural declining lines corresponds to a single measurement. Graph 910 illustrates decay of a 45 Hz mode without cancellation. On the vertical axis is a level of sound pressure, expressed in decibels, and on the horizontal axis is time in seconds. Decay of the mode is linear in decibel scale, meaning the sound level decays exponentially on a linear scale, losing a constant percentage of its energy in each reflection.

Graph 920 illustrates decay of the same mode using cancellation in accordance with an embodiment of the invention. The axes of graph 920 are similar to the axes of graph 910. As can be seen, the mode is caused to decay by more than 15 dB in about 70-80 milliseconds, while without cancellation, graph 910, a decay of 15 dB takes considerably longer, about 200 milliseconds.

FIG. 10 is a first flow graph of a method in accordance with at least some embodiments of the present invention. The phases of the illustrated method may take place in a loudspeaker or in a control element for inclusion in a loudspeaker, to control the functioning thereof. Phase 1010 comprises deriving, from first digital information describing a system impulse response caused by a loudspeaker to a first location in a first room, second digital information describing a cancelling impulse response. Phase 1020 comprises determining a delay value describing how much samples are to be shifted in time, and/or a gain factor describing how much the samples' magnitudes are adjusted, such that the energy associated with a sum of the system impulse response and the cancelling impulse response is minimized, or at least reduced. Finally, phase 1030 comprises employing the determined at least one of the delay value and the gain factor to generate a cancelling signal and adding the cancelling signal to the signal provided into the loudspeaker.

Figure 11:
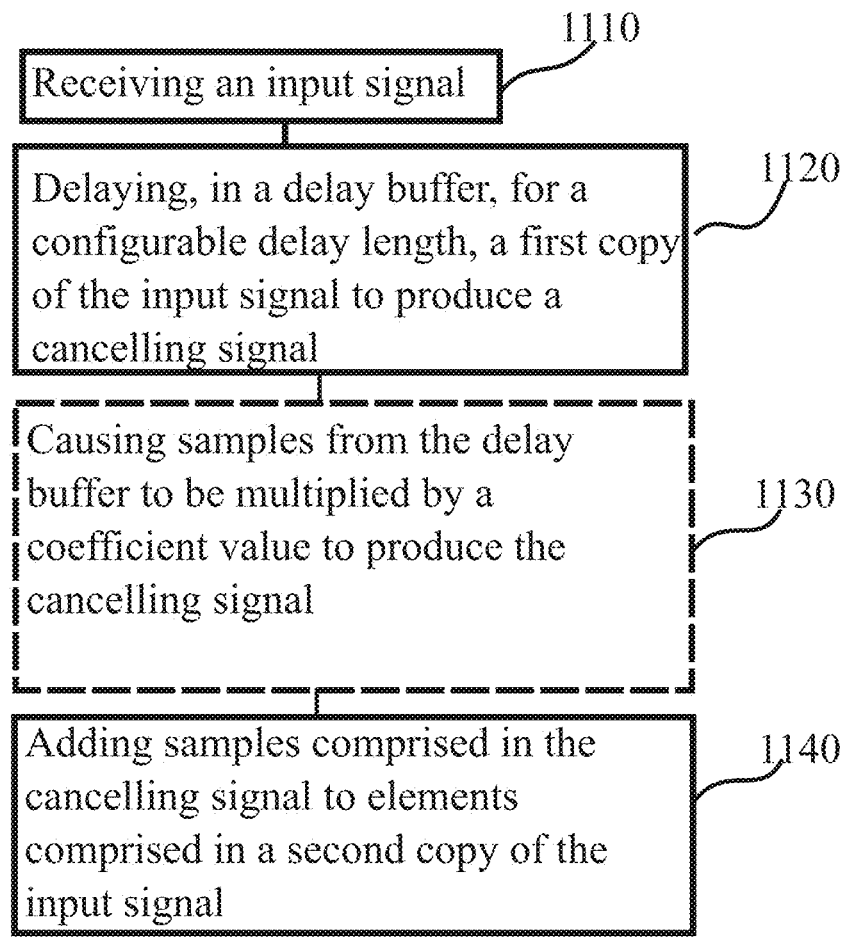
FIG. 11 is a second flow graph of a method in accordance with at least some embodiments of the present invention.

FIG. 11 is a second flow graph of a method in accordance with at least some embodiments of the present invention. The phases of the illustrated method may take place in a loudspeaker or in a control element for inclusion in a loudspeaker, to control the functioning thereof. Phase 1110 comprises receiving an input signal. Phase 1120 comprises delaying, in a delay buffer, for a configurable delay length, a first copy of the input signal to produce a cancelling signal. The value of the delay length may be set to the determined delay value, for example. Optional phase 1130 comprises causing samples from the delay buffer to be multiplied by a coefficient value in producing the cancelling signal. In general causing the samples to be multiplied by the coefficient value may comprise any sequence of processings that has the aggregate effect of multiplying the samples by the coefficient value. Finally, phase 1140 comprises adding samples comprised in the cancelling signal to samples comprised in a second copy of the input signal. The method may further comprise providing the second copy of the input signal to a loudspeaker after phase 1140, providing to the loudspeaker a version of the input signal that has been modified by adding the cancelling signal.

In general there is provided an apparatus comprising at least one processing core, at least one memory including computer program code, the at least one memory and the computer program code being configured to, with the at least one processing core, cause the apparatus at least to derive, from first digital information describing a system impulse response caused by a loudspeaker to a first location in a first room, second digital information describing a cancelling impulse response, determine, for samples comprised in the second digital information, at least one of a delay value describing how much the samples are to be shifted in time, and a gain factor describing how much the samples' magnitude is to be adjusted, so that an energy associated with a sum of the system impulse response and cancelling impulse response is minimized or at least reduced, and employ the determined delay and amplitude values to generate a cancelling signal, and to add the cancelling signal to a signal provided to the loudspeaker. Deriving the gain factor may comprise selecting the gain factor, for example the gain factor may be selected as −3 dB relative to the signal provided to the loudspeaker. Deriving the second digital information may comprise, at least in part, deriving it by copying the first digital information. Employing the determined delay value and gain factor to generate a cancelling signal may comprise producing a copy of the signal, delaying the copy by the delay value with respect to the signal and adjusting the amplitude of the copy based on the amplitude value.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An apparatus comprising at least one processing core, at least one memory including computer program code, the at least one memory and the computer program code being configured to, with the at least one processing core, cause the apparatus at least to:
derive, from first digital information describing a system impulse response caused by a loudspeaker to a first location in a first room, second digital information describing a cancelling impulse response;
determine, for samples comprised in the second digital information, exactly one delay value describing how much the samples are to be shifted in time and exactly one attenuation factor describing how much the samples' magnitude is to be reduced, so that an energy associated with a sum of the system impulse response and the cancelling impulse response is reduced, and
employ the determined delay value and the attenuation factor to generate a cancelling signal, and to add the cancelling signal to a signal provided to the loudspeaker.

2. The apparatus according to claim 1, wherein the signal provided to the loudspeaker comprises a payload signal.

3. The apparatus according to claim 1, wherein the at least one memory and the computer program code are configured to, with the at least one processing core, further cause the apparatus to receive the first digital information from a sensor.

4. The apparatus according to claim 1, wherein the at least one memory and the computer program code are configured to, with the at least one processing core, further cause the apparatus to derive the second digital information at least in part by multiplying each sample comprised in the first digital information by a coefficient value.

5. The apparatus according to claim 4, wherein the coefficient value comprises a negative value.

6. The apparatus according to claim 1, wherein the at least one memory and the computer program code are configured to, with the at least one processing core, further cause the apparatus to low-pass filter the first digital information before deriving the second digital information.

7. The apparatus according to claim 1, wherein the at least one memory and the computer program code are configured to, with the at least one processing core, cause the apparatus to determine the at least one of the delay value and the gain factor by employing an optimization algorithm.

8. The apparatus according to claim 7, wherein the optimization algorithm comprises at least one of a least-squares minimization, simulated annealing and direct search algorithm.

9. The apparatus according to claim 1, wherein the system impulse and the cancelling impulse response together form an equalized system impulse response.

10. An apparatus, comprising:
a receiver configured to receive an input signal;
a delay buffer configured to delay, for a configurable delay length, a first copy of the input signal to produce a cancelling signal, and
addition circuitry configured to add samples comprised in the cancelling signal to samples comprised in a second copy of the input signal, wherein in producing the cancelling signal the apparatus is further configured to cause samples from the delay buffer to be multiplied by a coefficient value, where the coefficient value causes the phase of the delayed first copy of the input signal to be effectively inverted.

11. The apparatus according to claim 10, further comprising a low-pass filter arranged to accept and low-pass filter the first copy of the input signal, and provide the low-pass filtered first copy of the input signal to the delay buffer.

12. The apparatus according to claim 10, further comprising a high-pass filter arranged to accept and high-pass filter the second copy of the input signal, and provide the high-pass filtered second copy of the input signal to the addition circuitry.

13. A method comprising:
deriving, from first digital information describing a system impulse response caused by a loudspeaker to a first location in a first room, second digital information describing a cancelling impulse response;
determining, for samples comprised in the second digital information, exactly one delay value describing how much the samples are to be shifted in time and exactly one attenuation factor describing how much the samples' magnitude is to be reduced, so that an energy associated with a sum of the system impulse response and the cancelling impulse response is reduced, and
employing the determined delay value and the attenuation factor to generate a cancelling signal, and adding the cancelling signal to a signal provided to the loudspeaker.

14. The method according to claim 13, wherein the signal provided to the loudspeaker comprises a payload signal.

15. The method according to claim 13, further comprising receiving the first digital information from a sensor.

16. The method according to claim 13, further comprising deriving the second digital information, at least in part, by multiplying each sample comprised in the first digital information by a coefficient value, where the coefficient value causes the phase of the signal to be effectively inverted.

17. A method, comprising:
receiving an input signal;
delaying, in a delay buffer, for a configurable delay length, a first copy of the input signal to produce a cancelling signal, and
adding samples comprised in the cancelling signal to samples comprised in a second copy of the input signal, wherein producing the cancelling signal further comprising: multiplying samples from the delay buffer by a coefficient value, where the coefficient value causes the phase of the delayed first copy of the input signal to be effectively inverted.

* * * * *